United States Patent Office 3,428,583
Patented Feb. 18, 1969

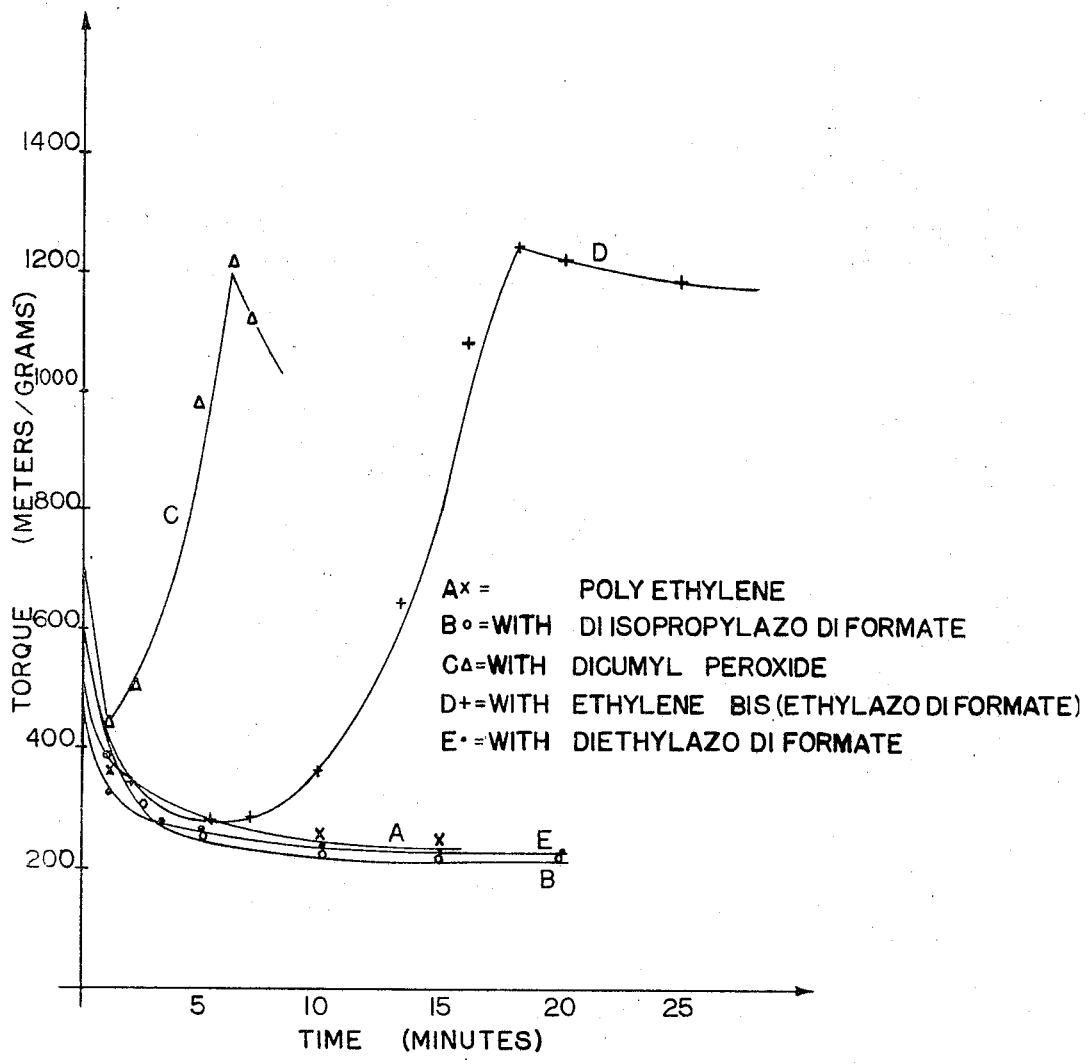

3,428,583
METHOD OF FOAMING AND CROSSLINKING POLYOLEFINS USING POLYAZODIFORMATE COMPOUNDS
Henry R. Lasman, Wilmington, Mass., assignor to National Polychemicals, Inc., Wilmington, Mass., a corporation of Massachusetts
Filed Feb. 24, 1966, Ser. No. 529,826
U.S. Cl. 260—2.5                 5 Claims
Int. Cl. C08f 47/08

ABSTRACT OF THE DISCLOSURE

Cellular polyolefin resin products are prepared by incorporating into a thermoplastic polyolefin resin an amount ranging from 0.5 to 20 parts of a polyazodiformate compound per 100 parts of the resin and heating the mixture to obtain a thermoset resin.

My invention relates to a method of curing or cross-linking organic polymeric materials, and the resulting modified polymers, and in particular to a method of preparing thermoset, cellular polyolefin resins.

It is an object of my invention to provide a means of curing or cross-linking polyolefin resins employing polyazoformates as a new and unique class of modifying agents.

Another object of my invention is to provide rigid and semirigid, cured, cellular polyolefin resin products.

Other objects and advantages of my invention will be apparent to those persons skilled in the art from the following more detailed description of my invention and the accompanying drawing wherein there is shown a representative graph of the modifying effect on a polyethylene resin of various additives.

Briefly, my invention involves the curing, modifying or cross-linking of olefinic resins by incorporating therein a small but modifying amount of a polyazo compound, and heating the resin to modify the resin properties. My discovery is unique and surprising in that related monoazo compounds fail to modify or cross-link polyolefin resins. Further, it has been found that the use of polyazo compounds also permit the preparation of unique rigid and semirigid thermoset, cellular structures of polyolefin resins. The particular selection of the polyolefin resin and the amount and nature of the polyazo compound permits the simultaneous foaming and modification of the polyolefin resin when the resin is heated to a temperature sufficient to decompose the polyazo additive.

The polyazo compounds useful as modifying agents in my invention comprise those compounds which contain the general structural group:

$$R{-}\!\left(\!N{=}N{-}\underset{X}{\overset{\|}{C}}{-}R_1\!\right)_{\!n}$$

where: $n$ is a number of 2 or more such as 3, 4, 5, 6; X is oxygen (i.e., a carbonyl group), sulfur (i.e., a thio group) or —NH (i.e., an imino group); $R_1$ is a halide like chlorine, bromine, fluorine, a nitrile, an amine, an alcohol, phenolic or hydroxy radical, a metal oxide radical with metals like sodium, potassium, barium, cadmium, zinc, lead, calcium, etc., or other salt or ester organic or inorganic radical; and R is any organic radical of sufficient valence (bi, tri, tetra, etc., valency) to connect the azo group radicals. For example, where $n$ is two R is an organic bivalent aliphatic, aryl, or heterocyclic radical. Typical R radicals include, but are not limited to: di and tris radicals such as alkylenes like diethylene, dipropylene, dihexylene, triethylene and other vinylene and vinyldiene radicals; arylenes like diphenylene and heterocyclics like furylidenes.

In one embodiment of my invention poly(azocarbonamides) of the general formula:

$$R{-}\!\left(\!N{=}N{-}\underset{X}{\overset{\|}{C}}{-}NH_2\!\right)_{\!n} \quad n\geq 2$$

are useful as blowing agents and cross-linking agents for polymeric compounds. Azocarbonamides may also be referred to as azoformamides. For example, azodicarbonamide, a commercial blowing agent is also well-known as azobisformamide.

Polyazocarbonamide compounds of two general configurations as presented below are useful as cross-linking agents:

(1)
$$R{-}\!\left(\!\underset{O}{\overset{\|}{C}}{-}N{=}N{-}\underset{X}{\overset{\|}{C}}{-}NH_2\!\right)_{\!n} \quad n\geq 2$$

and (2)
$$R{-}\!\left(\!N{-}\underset{O}{\overset{\|}{C}}{-}N{-}N{-}\underset{X}{\overset{\|}{C}}{-}NH_2\!\right)_{\!n} \quad n\geq 2$$

wherein

X is oxygen, sulfur or an NH (amino) group
R is an aliphatic, aromatic or heterocyclic radical The compounds of Class 1 may be prepared by reacting a polyvalent acid halide like a chloride with a semicarbazide, thiosemicarbazide or aminoguanidine, followed by the oxidation of the resulting hydrazo compound with chlorine, potassium permanganate, sodium bichromate, or any other suitable oxidizing agent. For example, typical polyazocarbonamides may be prepared as follows:

(a)
$$Cl{-}\underset{O}{\overset{\|}{C}}{-}(CH_2)_4{-}\underset{O}{\overset{\|}{C}}{-}Cl + 2NH_2{-}NH{-}\underset{O}{\overset{\|}{C}}{-}NH_2$$

adipyl chloride        semicarbazide $$H_2N{-}\underset{O}{\overset{\|}{C}}{-}HN{-}HN{-}\underset{O}{\overset{\|}{C}}{-}(CH_2)_4{-}\underset{O}{\overset{\|}{C}}{-}NH{-}NH{-}\underset{O}{\overset{\|}{C}}{-}NH_2$$

↓ oxidation $$H_2N{-}\underset{O}{\overset{\|}{C}}{-}N{=}N{-}\underset{O}{\overset{\|}{C}}{-}(CH_2)_4{-}\underset{O}{\overset{\|}{C}}{-}N{=}N{-}\underset{O}{\overset{\|}{C}}{-}NH_2$$

tetramethylene-bis(azodicarbonamide)

(b)
$$Cl{-}\underset{O}{\overset{\|}{C}}{-}\!\!\left\langle\phantom{xx}\right\rangle\!\!{-}\underset{O}{\overset{\|}{C}}{-}Cl + 2NH_2{-}NH{-}\underset{O}{\overset{\|}{C}}{-}NH_2$$

terephthalyl chloride       semicarbazide

↓

$$H_2N{-}\underset{O}{\overset{\|}{C}}{-}HN{-}HN{-}\underset{O}{\overset{\|}{C}}{-}\phi{-}\underset{O}{\overset{\|}{C}}{-}NH{-}NH{-}\underset{O}{\overset{\|}{C}}{-}NH_2$$

↓ oxidation $$H_2N{-}\underset{O}{\overset{\|}{C}}{-}N{=}N{-}\underset{O}{\overset{\|}{C}}{-}\phi{-}\underset{O}{\overset{\|}{C}}{-}N{=}N{-}\underset{O}{\overset{\|}{C}}{-}NH_2$$

p-phenylene-bis(azodicarbonamide)

In both instances, thiosemicarbazide and aminoguanidine would yield the corresponding thio and imino compounds, respectively.

The agents of Class 2 are prepared by reacting polyisocyanates with a semicarbazide, thiosemicarbazide or aminoguanidine followed by oxidation of the resulting hydrazides. For example, (a)

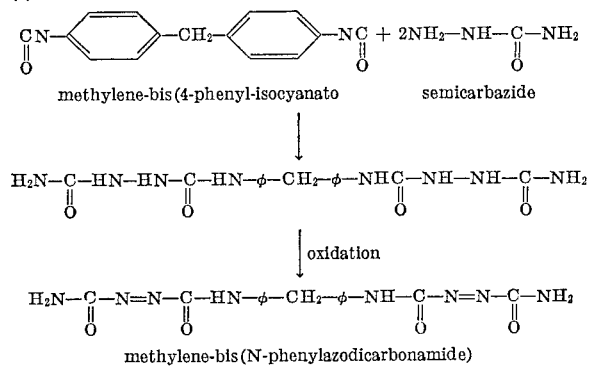

(b)

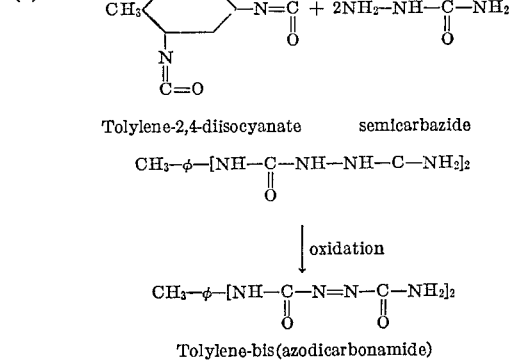

The poly(azodicarbonamides) of the two classes can be used as blowing agents and cross-linking agents for high polymers, especially polyolefin resins.

In another embodiment of my invention polyazoformates useful in cross-linking and foaming polyolefin and other thermoplastic resins include the dialkylene or diphenylene polyalkyl or other salt or organic acid esters of azodiformates. Diethylene bis(ethyl azodiformate) having the formula:

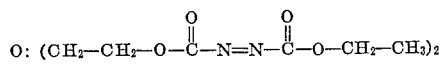

have been found to be an excellent foaming and cross-linking agent for polyolefin resins like polyethylene. This compound is a diester of an ethylene bisazodicarboxylic acid. Other typical polyazodiformate esters would also include triethylene bis(methyl azodiformate), dipropylene bis(phenyl azodiformate), dihexylene bis(isopropyl azodiformate) and the like. The polyazo ester compounds of my invention are unique as cross-linking agents in that the closely related mono azo ester compounds have very little or no cross-linking or modifying effects. Although the nature of the cross-linking effect is not entirely understood, it is believed to be functionally distinct from that of the commonly used peroxide cross-linking agents. It is believed that the polyazo compounds cross-link upon decomposition by creating nitrogen bridging within the polymer. Upon heating the polyazo compounds to a decomposition temperature, nitrogen gas is generated by the decomposition and cross-linking occurs before or at about the same time as decomposition.

The amount of polyazoformate esters employed as cross-linking agents in a polymer may be varied depending upon the nature of the polymer such as the type of polymer, molecular weight, or structure and the degree of cross-linking desired. Polyolefins of high molecular weight or of high density, i.e., branched chain polyolefin resins, may therefore require greater amounts to achieve the desired cross-linking or modifying effect than linear or low density resins. Typical amounts of the polyazo compounds which may be employed include from about 0.5 to about 20.0 parts of the cross-linking agent per 100 parts of resin, with amounts of from about 1 to 10 parts of the bis azodiformate typically required per 100 parts of olefinic resin. My polyazo additives may be mixed, blended, dispersed or otherwise compounded or mixed in any suitable manner with the polymers to be modified.

My cross-linking agents may be employed with other polyazo compounds and with other additives or polymers such as other nitrogen, hydrogen, carbon dioxide or other gas generating solid or liquid blowing agents like azodicarbonamide and sulfonyl hydrazides, cross-linking agents such as peroxides like dicumyl peroxide, initiators, stabilizers, antioxidants, activators, plasticizers, pigments like titanium dioxide, zinc oxide, carbon black, fillers, hindered phenols and the like.

Polyazocarbonamides useful as cross-linking agents are prepared by reacting a polyvalent acid chloride with a semicarbazide followed by oxidation of the resulting compound with chlorine, potassium permanganate, sodium bichromate or any other suitable oxidizing agent. The resulting diethylene bis(ethylazodiformate) is an orange-colored liquid, which has a decomposition temperature in air of about 200–210° C.

The preparation of aliphatic diazocarboxylic acid esters in general is described by Rabjohn in the Journal of the American Chem. Society, 70, 1181 (1949). The diethylene bis(ethylazodiformate) may have its decomposition temperature lowered by the use of Lewis acids, lead salts and the like (see Belgian Patents Ser. Nos. 651,277 and 651,278). Where the decomposition temperature of the polyazocarbonamide has not been lowered, resin cross-linking or modifying and/or foaming may be accomplished by heating the resin mixture containing the polyazo additive to or about the decomposition temperature of the polyazo additive, for example 170–250° C. such as 190°–210° C. Where some activation has occurred foaming and cross-linking may be obtained at a lower temperature, e.g., 170–200° C. or lower.

Polyazocarbonamide esters are employed as cross-linking agents in those organic polymers which contain essentially saturated carbon to carbon bonds or have non-elastomeric properties. My polyazo compounds are particularly useful as bifuntcional cross-linking and foaming agents for polyolefin resins. The thermoplastic polyolefin resins useful in my invention include both the high and low density, linear and branched chain, crystalline and amorphous thermoplastic, polyethylene, polypropylene, ethylene-propylene copolymers and ter-polymers, polybutene, ethylene-butene resins, and similar thermoplastic $C_2$–$C_6$ polyolefin homo and copolymeric resins. The melt indices of such resins may vary from 0.5–200 e.g., 1–50 or higher.

Where cross-linking alone is desired with little or no foaming, i.e., thermoset cellular structure, of the cross-linked resin, the resin containing the polyazo compound should be heated to a temperature of about or slightly below the decomposition temperature of the polyazo agent. In addition, where a cellular structure is to be avoided or minimized, a resin may be selected which has proper fluid flow or melt characteristics, so that the resin is substantially or completely fluid at a low viscosity at or before the decomposition temperature of the polyazo compound. In this manner, the polymer will have reduced gas retention properties and all or a substantial part of any nitrogen gas generated will escape from the resin melt without being retained or creating a cellular structure, while a cross-linking effect will still occur.

Polymers modified with my polyazo compounds have an increased heat-distortion temperature, improved chemical resistance and improved mechanical properties such as tensile strength. When simultaneous foaming and cross-linking occur, my method provides unique white, thermoset, cellular, polymeric structures. My method is of particular importance with high-melting polymers like polyethylene and polypropylene which normally are difficult to cross-link or where both cross-linking and foaming action is desired.

EXAMPLE 1

To demonstrate the unique cross-linking effects of polyazo compounds, various additives were incorporated in an amount of 3.0 parts per weight per 100 parts of resin in a high density polyethylene resin identified as Microthene No. 706 (U.S. Industrial Chemicals Co.) having a melt index of 22. The cross-linking effect of each additive was then determined by the method described by Gregorian & Bafford in I. & E. C. Product Research & Development, 3[4], 267–69 (1964). My test employed the use of a Brabender Plastograph machine with a cam-type head at a test temperature of 200° C. and shear rate of about 63 r.p.m. The dry blended polyethylene mixture containing each additive was milled on the Brabender Plastograph and a record made of the change in torque (measured in meters per gram) versus the blending time (in minutes). The total torque increase is a measure of the thermostability and of the cross-linking or modifying effect of each additive on the resin. The results of the various tests carried out are shown in the accompanying drawing wherein (A) represents the polyethylene resin, (B) the resin with diisopropyl azodiformate, (C) the resin with dicumyl peroxide, (D) the resin with diethylene bis(ethylazodiformate) and (E) the resin with diethylazodiformate.

The test rsults showed that the polyethylene resin alone (A) and with the monoazo ester compounds (B) and (E) as additives exhibited little or no change in the torque. Under the same conditions diethylene-bis-ethylazodiformate (D), a polyazo compound, caused a characteristic modifying or cross-linking increase in torque properties. This increase in torque properties was similar to that obtained with the well-known commercial cross-linking agent dicumyl peroxide (C). The peroxide cross-linked polyethylene resin was on examination brittle in character, while the bis-azodiformate ester cross-linked polyethylene resin was hard, but more elastic in its properties. The particular shape of curves (C) and (D) indicate that cross-linking has occurred, while the greater time lapse of torque increase with curve (D) indicated the greater thermostability of the resin with the bis azo compound in comparison to the peroxide additive. The peroxide additive functions by abstracting a hydrogen atom from the resin creating activated sites for cross-linking to occur. This test was repeated in a similar manner employing other resins such as a linear polyethylene melt index 0.19, branched polyethylene melt index 1.7, and polyethylene-polybutene copolymer melt index 0.2 and similar results observed.

EXAMPLE 2

To demonstrate the foaming and cross-linking efficiency of diethylene bis(ethylazodiformate) this additive was dry-blended with the powdered Microthene 706 polyethylene resin of Example 1 at a level of 3 parts per 100 parts of the resin. This blend was then placed in an aluminum dish and heated for about 10 minutes at about 200° C. A white, cross-linked, semirigid polyethylene cellular foam structure was produced.

EXAMPLE 3

A cellular, cross-linked polyethylene resin is prepared by incorporating into a dry polyethylene resin powder about 3 parts per 100 parts of the resin of a tetramethylene bis(azodicarbonamide), and heating the resulting mixture to a temperature of between 200° and 225° C., to produce a cross-linked foamed resin structure.

EXAMPLE 4

A polypropylene resin is modified in properties by dispersing with the resin particles about 8.0 parts per 100 parts of resin of paraphenylene-bis(azodicarbonamide), and heating the resulting mixture to a temperature of about 200° C.

EXAMPLE 5

A high density polyethylene resin is cross-linked by incorporating therewith about 3 parts per 100 parts of the resin of a methylene - bis(N - phenyl azodicarbonamide) or (azodicarbonamide) and heating the resin to the decomposition temperature of the polyazo additive.

In summary, my invention permits the formation of unique, white, rigid and semirigid type cellular, thermoset polyolefin resin structures by the use of a polyazo agent as a curing or modifying agent and as a bifunctional blowing and cross-linking agent.

What I claim is:

1. A method of modifying polyolefin resins which method comprises:
   incorporating a modifying amount of a polyazodiformate compound into a thermoplastic polyolefin resin, the modifying amount ranging from about 0.5 to 20 parts of the polyazodiformate per 100 parts of the resin; and
   heating the resin to a temperature of from about 170 to 250° C., thereby obtaining a thermoset resin wherein the polyolefin resin is selected from the group consisting of polyethylene, polypropylene, ethylene-propylene copolymers and ethylene-butene copolymers.

2. The method of claim 1 wherein the polyazodiformate is a diester of an alkylene-bis-azodicarboxylic acid.

3. The method of claim 1 wherein the polyazodiformate is selected from the group consisting of diethylene bis(diethyl azodiformate), tetramethylene-bis(azodiformamide), para - phenylene - bis(azodiformamide), methylene-bis(N-phenyl azodiformamide), and tolylene-bis(azodiformamide).

4. The method of claim 1 wherein the polyolefin resin is an ethylene resin, the polyazodiformate is diethylene bis(ethyl azodiformate), and the resin is heated to a temperature of from 190° to 210° C.

5. The method of claim 1 wherein the polyolefin resin is a gas-expandable, gas-retentive resin, and wherein the polyazodiformate is heated to a temperature sufficient to decompose the polyazodiformate and generate a gas thereby producing a thermoset, cellular polyolefin product.

References Cited

UNITED STATES PATENTS

| | | | |
|---|---|---|---|
| 2,518,249 | 8/1950 | Ott | 260—2.5 |
| 2,532,243 | 11/1950 | Ott | 260—2.5 |
| 3,137,745 | 6/1964 | Johnstone | 260—2.5 |
| 3,211,677 | 10/1965 | Field et al. | 260—2.5 |
| 3,306,862 | 2/1967 | Mageli et al. | 260—2.5 |

MURRAY TILLMAN, *Primary Examiner.*

MORTON FOELAK, *Assistant Examiner.*

U.S. Cl. X.R.

260—94.9, 145, 146, 166, 169, 173, 174